(12) United States Patent
Kaminagayoshi (10) Patent No.: US 7,509,593 B2
(45) Date of Patent: Mar. 24, 2009

(54) MOUSE SOUND VOLUME CONTROL (75) Inventor: Takehiro Kaminagayoshi, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 11/129,191

(22) Filed: May 12, 2005

(65) Prior Publication Data

US 2006/0259877 A1  Nov. 16, 2006

(51) Int. Cl.
*G06F 3/048* (2006.01)
(52) U.S. Cl. ............ 715/862; 715/856; 715/858; 715/865; 715/866; 715/727; 715/711
(58) Field of Classification Search .......... 715/858, 715/862, 856, 865, 866, 727, 711
See application file for complete search history.

(56) References Cited

U.S. PATENT DOCUMENTS

| | | | | |
|---|---|---|---|---|
| 5,461,399 A | * | 10/1995 | Cragun | 715/729 |
| 5,903,727 A | * | 5/1999 | Nielsen | 709/212 |
| 6,046,722 A | * | 4/2000 | McKiel, Jr. | 715/862 |
| 6,093,880 A | * | 7/2000 | Arnalds | 84/464 R |
| 6,714,215 B1 | * | 3/2004 | Flora et al. | 715/716 |
| 7,164,410 B2 | * | 1/2007 | Kupka | 345/156 |
| 2004/0056885 A1 | * | 3/2004 | Azami et al. | 345/723 |
| 2004/0207658 A1 | * | 10/2004 | Awada et al. | 345/747 |
| 2005/0204312 A1 | * | 9/2005 | Rosel | 715/862 |

* cited by examiner

*Primary Examiner*—Weilun Lo
*Assistant Examiner*—Rashedul Hassan
(74) *Attorney, Agent, or Firm*—Workman Nydegger (57) ABSTRACT

A distance between a cursor and an object displayed on a Web page or other image automatically controls a volume with which an audio file associated with the object is played. A user can thus explore a displayed image to discover audio files associated with different objects or portions of the displayed image. The audio files can provide instructions, data, music, sound effects, or almost any other form of audible sound desired. The designer and/or the user of the displayed image can set parameters that control how the audio files are played, such as the maximum distance of a cursor from an object to initiate play, the relative priority of the objects, and the maximum number of audio files that are simultaneously played.

20 Claims, 6 Drawing Sheets

MOUSE SOUND VOLUME CONTROL

FIELD OF THE INVENTION

This invention generally pertains to controlling the volume of an audio file with a pointing device, and more specifically, to controlling the volume of an audio file that is associated with an object or portion of an image on a display, in response to a distance between the object and a cursor that is controlled by a user with a pointing device.

BACKGROUND OF THE INVENTION

Web pages that include audio files are often downloaded from a server. The audio files are sometimes activated when a user initially opens the Web page within an Internet browser window. Alternatively, an audio file can automatically be played when a user selects a file play option labeled so that the user is aware that the audio file will thus be played. In some Web page designs, there may be no indication that an audio file is associated with an object, but by selecting the object with a cursor, the audio file is automatically played. A user would clearly expect an audio file to be played if a label or graphics that is displayed with an object or option includes an audio file name with an extension indicating that the file is, for example, an MPEG-1 or MPEG-2, layer 3 (.mp3) file or a Windows Media Audio (.wma) file. However, a user may be surprised when simply selecting an object in a Web page with the cursor, causes an audio file to be played, if the association of the object with an audio file is not visually apparent to the user. Clearly, the use of an audio file in connection with an object on a Web page in this manner provides a more interesting experience for a user interacting with the Web page and is a desirable design option when creating a Web page.

Audio files can comprise music, or text. Requiring a user to actually select or place a cursor on an object, or other portion of a display to initiate play of an associated audio file (i.e., when the existence of the audio file is not indicated to the user) may preclude the user from actually discovering that option. Unless the user actually moves the cursor onto the object, or portion of an image, the audio file will not play and the user will not be rewarded with hearing the content of the audio file. Accordingly, it would be preferable to instead enable a user to discover audio files associated with one or more objects or portions of a displayed image by providing a more free form of interaction with the displayed image that enables the user to more readily hear any audio file provided. It would be desirable to provide a Web page or other displayed image in which an audio file can be initiated to play when the cursor is moved within a predefined distance of an object with which the audio file is associated, since this approach should greatly expand the opportunity for a user to discover and listen to the audio file. It would also be preferable to enable the user to control the volume when the audio file is playing, simply by moving the cursor closer to the object or portion of the image displayed to increase the volume, or further away to reduce the volume.

The designer of a Web page or other displayed image or the user may want to control various parameters related to this feature. Accordingly, it would also be desirable to enable the user to define parameters such as the number of objects on a Web page or displayed image with which an audio file can be associated, the maximum distance from the object at which the cursor can cause play of the audio file to be initiated, and the number of audio files that can be simultaneously played in response to the proximity of the cursor. These and other parameters should be selectable to enable the designer and/or the user to control the functionality of the feature. For example, the designer or user may not want to hear more than one audio file at a time, to avoid a possible cacophony caused by the sounds of multiple audio files heard at the same time.

A person designing a Web page should be able to designate the objects or portions of the Web page with which audio files are associated and of course, should be able to choose the audio file associated with each such object or portion of a displayed image. It might be desirable to automatically assign default parameter values for this functionality when used on a Web page or displayed image, but enable a designer to make changes to the default parameters, as deemed appropriate. Moreover, it seems preferable that a user should ultimately be able to choose the parameters that control how a Web page or other displayed image is experienced by the user.

As should be evident, this same functionality would be desirable in other applications besides an Internet browser that is displaying Web pages. Although many other software programs in which it may be applicable readily come to mind, an application such as a word processing program could also use this concept, for example, to enable a user to access various help options in a help menu. Thus, in much the same manner as noted above in connection with a Web page, it would be desirable to enable an audio file to be played and to control its volume as a function of the distance of the cursor from an object or portion of a displayed image with which the audio file is associated, in almost any type of software application, enabling the user to readily interactively explore the displayed image. An audio file used in a displayed image of a software application might provide simple instructions about a specific option, or might instruct a user about how to access further features related to an object or portion of the displayed image. Clearly, the range of content provided by an audio file associated with an object or portion of an image displayed to a user is virtually limitless, which makes this concept particularly powerful and useful.

SUMMARY OF THE INVENTION

In consideration of the preceding discussion, one aspect of the present invention is directed to a method for controlling play of an audio file that is associated with a portion of a displayed image. The method includes the step of determining a distance between the portion of the displayed image and a cursor on the displayed image. The displayed image can be a Web page, a document, or almost any other type of graphic, text, or block included in a displayed image. Play of the audio file is automatically initiated if the distance between the cursor and the portion of the displayed image is less than a predefined value. The volume of sound heard when the audio file is played is automatically controlled as a function of the distance between the cursor and the portion of the image. Thus, the volume increases as the distance decreases and increases as the distance decreases.

The displayed image may include a plurality of different portions that are each associated with a corresponding audio file, so that each such audio file is played as discussed above, as a function of the distance between the corresponding portion of the image and the cursor. The method preferably further includes the step of enabling a designer of the displayed image to assign a priority to each portion of the displayed image that is associated with an audio file. In addition, the method preferably enables the designer of the displayed image, and/or a user who will hear the sound of audio files that are played in response to the disposition of the cursor within the image, to selectively set at least one parameter for controlling the play of the audio files. For example, a parameter might be selectively set to permit only a predefined number of audio files to be played concurrently. The designer or user may believe that if too many audio files are played sufficiently loudly at the same time, the result may sound like disagreeable noise and not be appreciated. Accordingly, it is preferable to assign a priority to each audio file, or to each portion of the displayed image with which one of the audio files is associated. The priority can then be applied to determine the audio file that is played if more than the predefined number of audio files would otherwise be played in response to the distance of the corresponding portions of the displayed image from the cursor.

As noted above, the image can comprise a Web page, or can be an image produced by a software application. The method can further include the step of associating a header with the displayed image. The header identifies the portions of the image with which the audio files are associated and indicates the relative priority assigned to each portion of the image associated with an audio file.

The concept of controlling sounds in response to the distance between a cursor and an object is not limited to a two-dimensional display, but can also be applied to a three-dimensional display. It is contemplated that in such an embodiment, images, icons, or other types of objects appearing in a browser or in applications can be allocated in a three-dimensional space. The user can then control the volume of sounds associated with these objects by varying the distance between the cursor (or any equivalent user-controlled item) and any of these images, icons, or objects. This function should greatly expand the experience enjoyed by users as they hear various types of sounds from various directions, just as if they were in a real three-dimensional environment, e.g., moving through a city and hearing the sounds that would be present in a city while passing various sound sources represented by objects in a virtual environment display.

Another aspect of the present invention is directed to a memory medium storing machine instructions for carrying out the steps of the method discussed above. Yet another aspect of the invention is directed to a system for enabling a user to control play of an audio file that is associated with a portion of a displayed image. The system includes a display for displaying images, a pointing device for controlling a position of a cursor on the display, a memory in which machine instructions and data are stored, and a processor that is coupled to the display, the pointing device, and the memory. The processor executes the machine instructions to carry out a plurality of functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing Device

Figure 1:
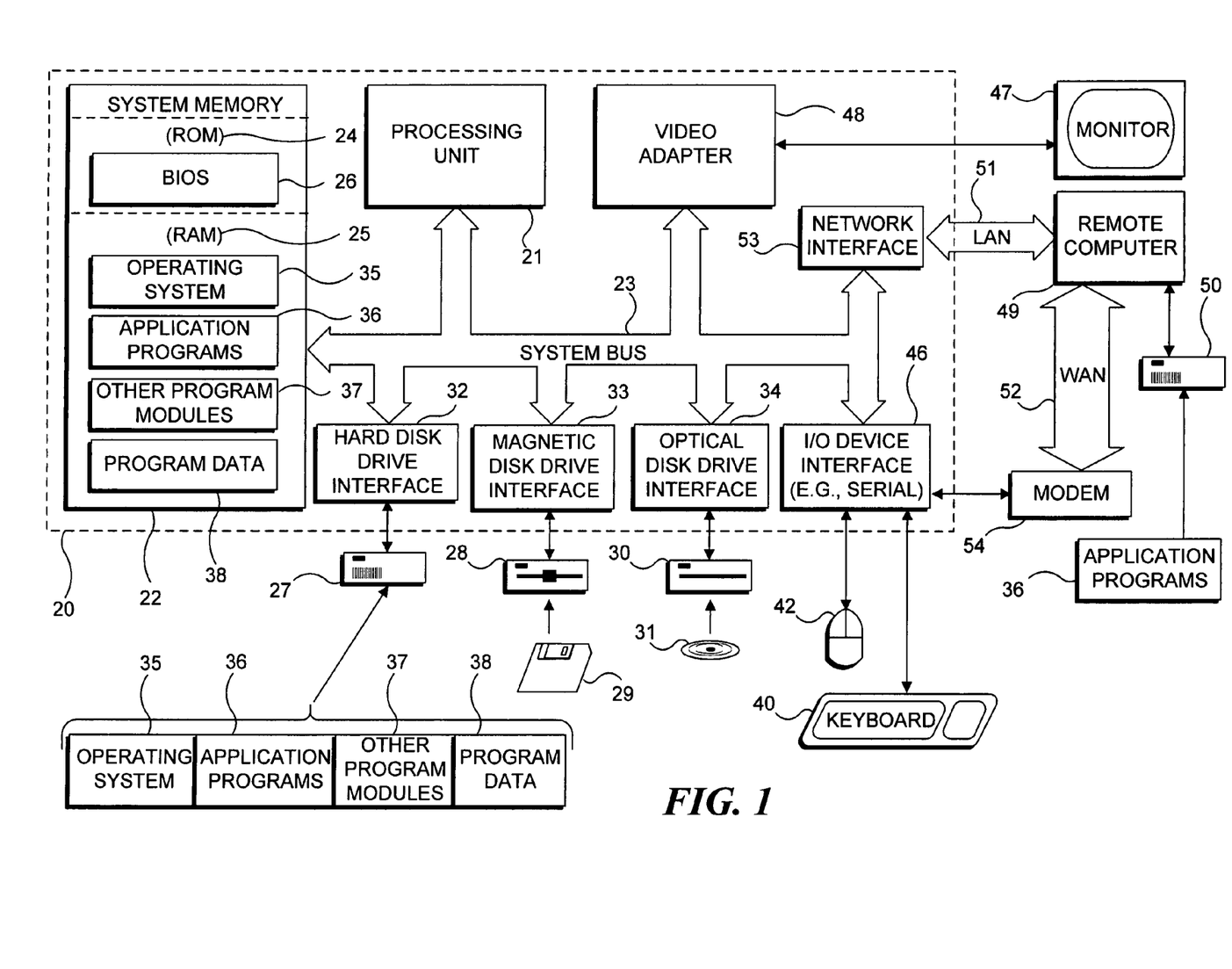
FIG. 1 is a functional block diagram of a general purpose computing device in the form of a conventional personal computer (PC) for use in an exemplary system in which the present invention is implemented.

FIG. 1 and the following discussion are intended to provide a brief, general description of a suitable computing environment in which software implementing the method of present invention may be implemented. The present invention may be practiced on a single computing device, but can also be practiced on a plurality of computing devices. The present invention can thus be implemented on a computing device comprising a general purpose personal computer (PC), or other such computing device.

Although not required, the present invention will be described in the general context of computer executable instructions, such as program modules, which are executed by a PC. Generally, program modules include application programs, such as computer simulations, routines, objects, components, functions, data structures, etc. that perform particular tasks or implement particular abstract data types. In addition, those skilled in the art will appreciate that this invention may be practiced with other computer system configurations, particularly in distributed computing environments, where tasks are performed by remote processing devices that are linked through a communications network. In a distributed computing environment, program modules may be located in either or both local and remote memory storage devices.

With reference to FIG. 1, an exemplary system for use as a server or client machine, or a stand alone device for executing the present invention includes a general purpose computing device in the form of a conventional PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disc 29, and an optical disk drive 30 for reading from or writing to a removable optical disc 31, such as a CD-ROM or other optical media Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disc 29, and removable optical disc 31, it will be appreciated by those skilled in the art that other types of computer readable media, which can store data that are accessible by a computer, such as magnetic cassettes, flash memory cards, digital versatile discs (DVDs), Bernoulli cartridges, RAMs, ROMs, and the like, may also be used in the exemplary operating environment.

A number of program modules may be stored on the hard disk, magnetic disc 29, optical disc 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated environment, and/or other information. In addition to the monitor, PCs are often coupled to other peripheral output devices (not shown), such as speakers (through a sound card or other audio interface (not shown)) and printers.

As indicated above, the invention is implemented in a networked environment, in which PC 20 is logically connected to one or more clients, such as a remote computer 49. Remote computer 49 may be another PC, a router, a network PC, a peer device, a satellite, or other common network node comprising a client. Remote computer 49 is a game console in one preferred application of the present invention, as will be described in greater detail below. Remote computer 49 may include many or all of the elements described above in connection with PC 20, may include the elements described below in connection with a gaming console, or may include typical elements of other electronic devices that can function as a client. So as not to make FIG. 1 unnecessarily complex, remote computer 49 is shown with only an external memory storage device 50. The logical connections depicted in FIG. 1 include a local area network (LAN) 51 and a wide area network (WAN) 52, which may encompass the Internet. Such networking environments are common in offices, enterprise wide computer networks, intranets, and in regard to computing devices coupled to the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication between remote computing devices is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Web Page Using the Present Invention

Figure 2:
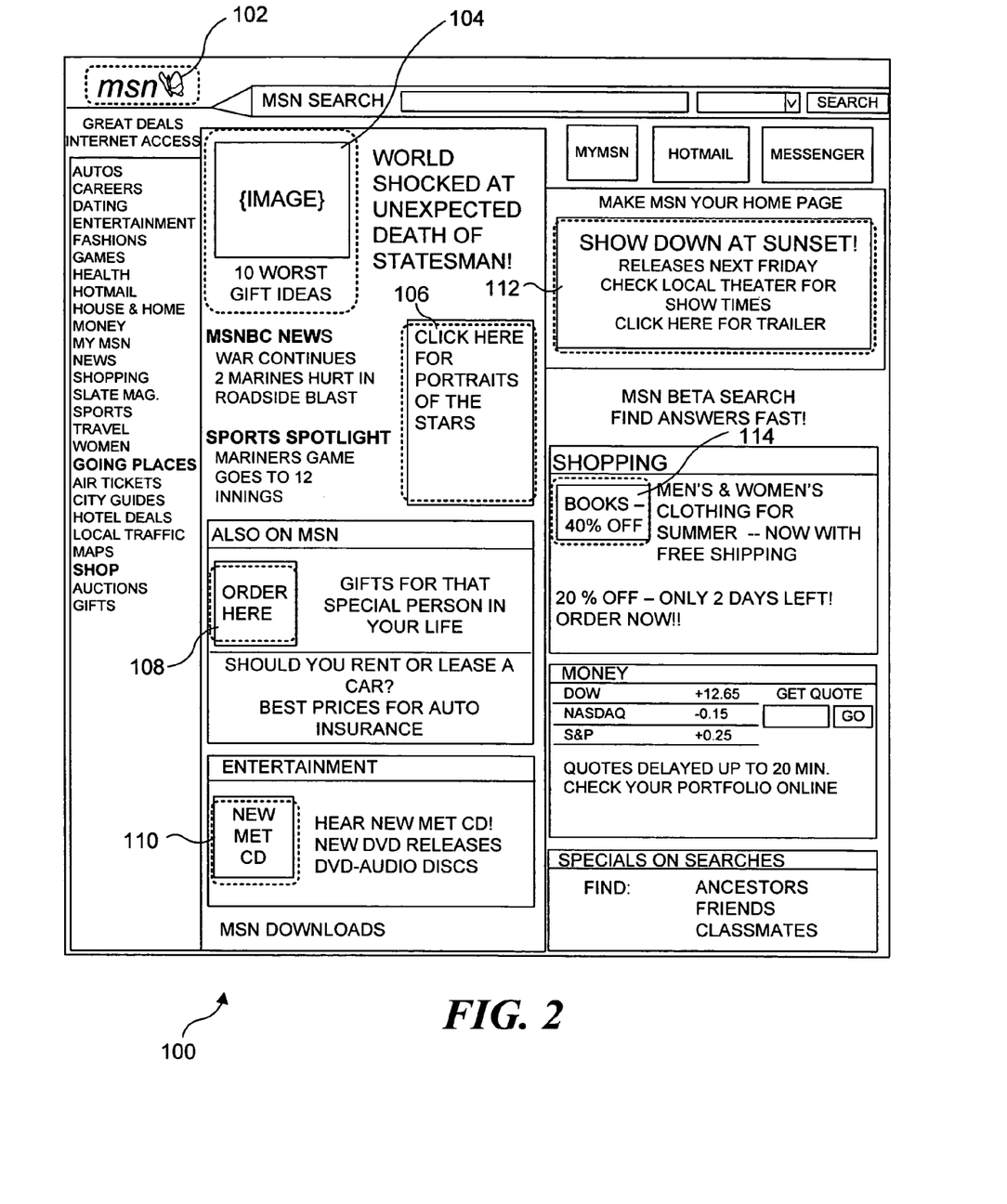
FIG. 2 is an exemplary Web page in which portions of the Web page (indicated with dotted-line rectangles—not visible to a user) are associated with audio files (not shown) that are played and controlled in accord with the present invention.

As will be apparent from the discussion that follows below, the present invention is useful in a displayed image that might be produced by many different types of software programs. However, an exemplary illustration in FIG. 2 shows how the present invention is used in a Web page 100. Web page 100 is a simplified version of a typical Web page that might be accessed on Microsoft Corporation's MSN.com Web site. To simplify this illustration, graphic images that would normally be displayed as part of the Web page are not shown in FIG. 2. Included on Web page 100 are a plurality of objects or portions of the displayed Web page image that have previously been associated by the designer of the Web page with specific audio files. The audio file associated with each object or portion of the displayed Web page is not indicated or visually evident to a user who opens the Web page within an Internet browser; however, the identification of the audio file associated with each object or portion of the image and other parameters related to the control for playing the audio files will likely be passed to the browser as part of a header that is included when the Web page is downloaded from the server or other source of the Web page accessed by the user, for display in the Internet browser.

Specifically, Web page 100 includes objects 102, 104, 106, 108, 110, 112, and 114 that are each associated with a different audio file. As will be evident from a quick review of Web page 100, these objects can, for example, comprise a logo, an image, a text block, or almost any other discrete region or area within the displayed image, which may not be visually evident to a user. As used herein and in the claims that follow, it will be understood that references to "object" and/or "portions of a displayed image" or "layout" are intended to refer to a designated region of thing within the display that is associated with an audio file and is not intended to be limited to any of the examples shown. Each of these objects is identified in FIG. 2 by a dotted-line rectangle that surrounds the object. It should further be understood that this rectangle is preferably not visible to the user viewing Web page 100 (although the dotted-line rectangle or other visual cue could alternatively optionally be employed to indicates such objects), but is simply included in this drawing to provide an indication of those objects or portions of the displayed image with which an audio file has been associated by the designer of the Web page.

Figure 3:
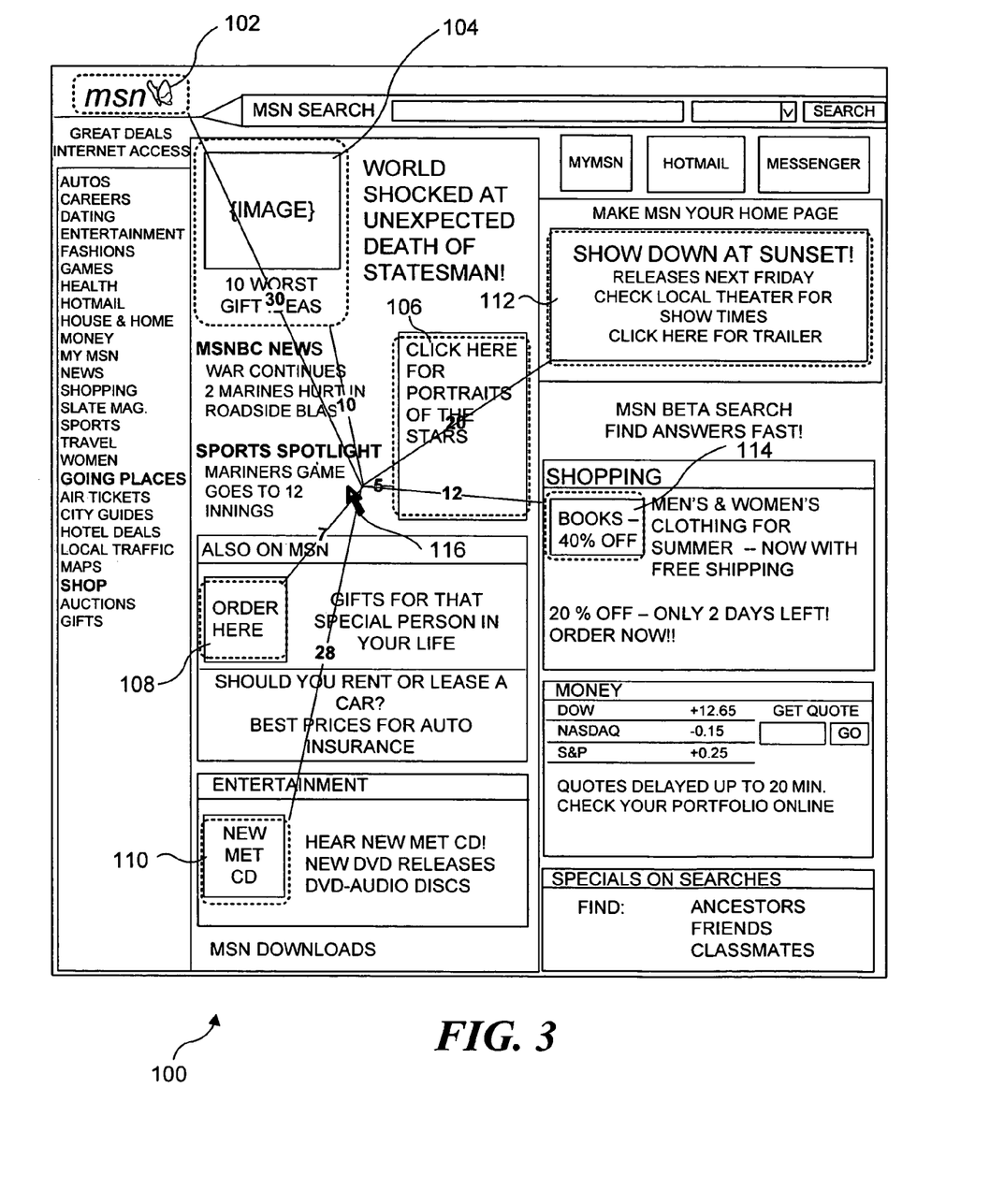
FIG. 3 illustrates the exemplary Web page of FIG. 2 and shows the distances between a current cursor position and each of the objects or portions of the Web page with which audio files are associated.

It is not necessary for a user viewing Web page 100 to select or double-click on an object with which an audio file is associated to cause the audio file to be played. Instead, the user simply positions a cursor 116, as shown in FIG. 3, so that the cursor is within a maximum predefined distance from an object, thereby causing the audio file associated with that object to start playing. The user need not know what the predefined distance is, since the user can explore Web page 100 to empirically develop a feel for this predefined distance by simply moving cursor 116 around on the Web page relative to different portions of its and experiencing the sound produced by playing the audio file associated with an object when the cursor is within the predefined distance from the object. Also, optionally, it is possible for a designer of the Web page to set a different maximum predefined distance for different objects or portions of the Web page with which an audio file is associated.

More importantly, the present invention enables the user to control the volume of the sound produced by playing the audio file associated with an object, as a function of the distance between the cursor and that object. In FIG. 3, the distances between cursor 116 in each of objects 102-114 has been indicated by values shown on straight lines extending between the cursor and the objects. Again, it should be emphasized that the lines and distances will normally not be rendered or visible to a user viewing Web page 100, but are included in this Figure to more clearly illustrate how the present invention functions.

For the current position of cursor 116, the distance between the cursor and object 106 is equal to five units, while the distance between the cursor and object 108 is equal to seven units. The term "units" as used herein is arbitrary and can represent a measurement in pixels, inches, or mm, etc. Assuming, for example, that the predefined maximum distance at which an audio file associated with an object will start to play is equal to 8 units, it will be apparent that the audio file associated with object 106 would have begun playing so that its sound would be audible to a user at a relatively higher volume than the audio file associated with object 108. The volume of the audio file associated with object 106 would be louder, because the cursor is relatively closer to object 106 than to object 108. Thus, it will be apparent from this example that the volume of the sound heard by a user when an audio file is played is inversely proportional to the distance between the cursor and the object with which the audio file is associated.

Clearly, the nominal maximum volume at which the sound from an audio file is heard when the cursor is moved to contact an object is determined by a number of factors, including the content of the audio file, the volume setting of the audio system that drives speakers/headphones through which the sound of the audio file is heard, the efficiency of the speakers/ headphones, as well as the setting of volume control within the operating system mixer or other software or hardware mixer or volume control that is employed to control the sound card or module in the user's PC.

Furthermore, the distance between an object and the cursor can control the volume of sound produced by playing an audio file associated with the object based on either a logarithmic relationship or a linear relationship, in inverse proportion to the distance of the cursor from the object. A logarithmic relationship is preferable, because the volume of the sound will then be varied in a way that more closely matches the response of the human ear.

It is likely that when designing a Web page in which the present invention is employed, a number of default parameters will apply that are applicable to the use of the distance between the cursor and object in controlling the volume of an audio file that is associated with the object. Naturally, the designer of a Web page will want to be able to selectively modify any of these default parameters as desired, and as appropriate to the nature of the Web page or other displayed image in which the present invention is used. Although it is possible for each object to have different parameters applied in connection with playing the audio file associated with it, a designer of a Web page would likely prefer to implement the invention with common parameters applied to all such objects.

One of the potential issues that arises in connection with the present invention is determining the number of audio files that are simultaneously audible to a user as the user employs a pointing device to move a cursor about on a Web page or other displayed image. If only two or three audio files are playing at the same time, and if the volume of one of these audio files is substantially louder than that of the others, a user should be able to clearly distinguish the content of the audio file that is louder relative to the background sound produced by the other one or more audio files. However, it is likely that if more than three audio files are playing simultaneously, particularly if all have about the same volume level, a user will likely be unable to readily distinguish the content of any one of the audio files from that of the others. At some point, the sound from multiple audio files playing simultaneously will be more of a cacophony and therefore, undesirable. Accordingly, one key parameter applicable to the present invention will be the number of audio files that can play simultaneously. As already noted, another parameter that can selectively be set is the maximum predefined distance between an object and the cursor at which play of an audio file associated with the object will be initiated. Since these two parameters are interactive in determining the audio files that are currently playing, it will be necessary in most cases for a designer of a Web page or other displayed image to indicate a relative priority for each of the objects/audio files on the Web page or other displayed image, to determine which audio files are played by the logic if more than a maximum number specified would otherwise be playing at one time, based upon the distance between the associated objects and the cursor. Further details relating to this point are discussed below.

Figure 4:
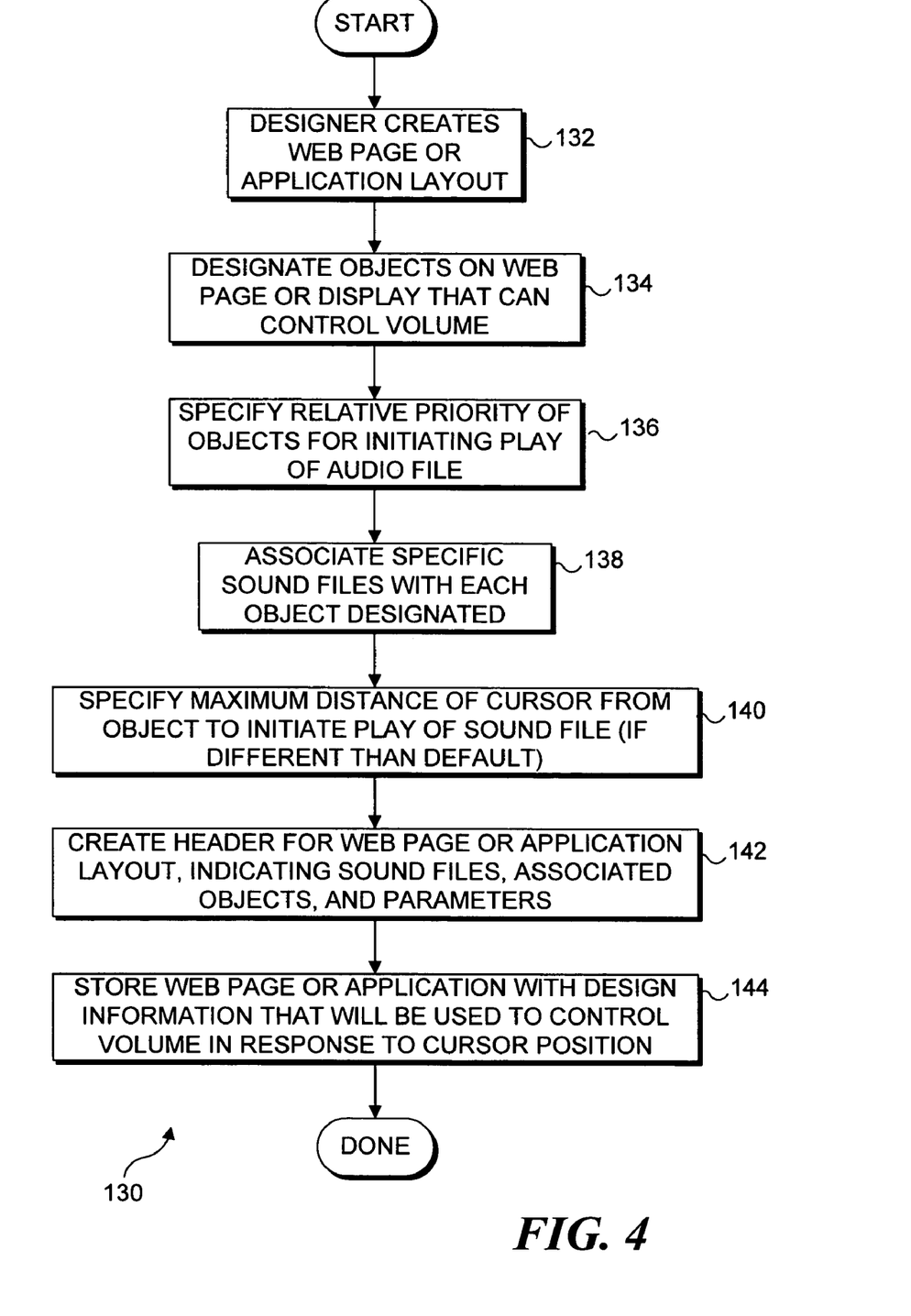
FIG. 4 is an exemplary flow chart showing the logical steps for creating a Web page or displayed layout for another type of software application that includes one or more objects or portions that are associated with audio file(s)

Logical Steps for Creating a Displayed Image that Implements the Present Invention The steps of this invention that are carried out by the designer of a Web page or the designer of any other image displayed by a software program are shown in a flowchart 130 in FIG. 4. In a step 132, a designer will create a Web page or application layout that includes objects or portions of the image displayed with which audio files are to be associated. In a step 134, the designer designates those objects on the Web page or portions of the displayed image that are to be used for controlling the volume of specific audio files, generally as described above, and in a step 136 specifies the relative priority of each object in initiating play of its audio files. The designer picks the specific sound file that is associated with each object thus designated, in a step 138. A sound file that is thus designated can comprise a *.WMA file, a *.MP3 file, a *.WAV file, or some other form of audio file. The audio file may be compressed, either using a lossy or non-lossy compression scheme, or may be non-compressed. Further, the content of the audio file may be a virtually any type of sound that is audible to the human ear, including music, spoken text, sound effects, etc. The choice of the audio file associated with an object will clearly be made by a designer to provide either information, related data, an interesting effect, or for some other purpose related to that object.

The designer then specifies the parameters associated with the Web page or application layout that has been created, or may elect to simply employ default values for any of these parameters. Thus, in a step 140, the designer specifies the maximum distance of the cursor from an object to initiate play of a sound file (if the desired maximum distance is different than the default value for this parameter). In a step 142, the header for the Web page or application layout that has been designed is created. Alternatively, another file can be created for use in a particular software program each time that an image is displayed to the user that includes the objects or portions of the displayed image that are associated with audio files. Step 142 thus employs a header or other data source for conveying the parameters related information used by the present invention for carrying out its functionality. In a step 144, the Web page or the application layout that was created is stored with the design parameters and information that will be used to control the volume with which a sound file is played, as discussed above.

Figure 5:
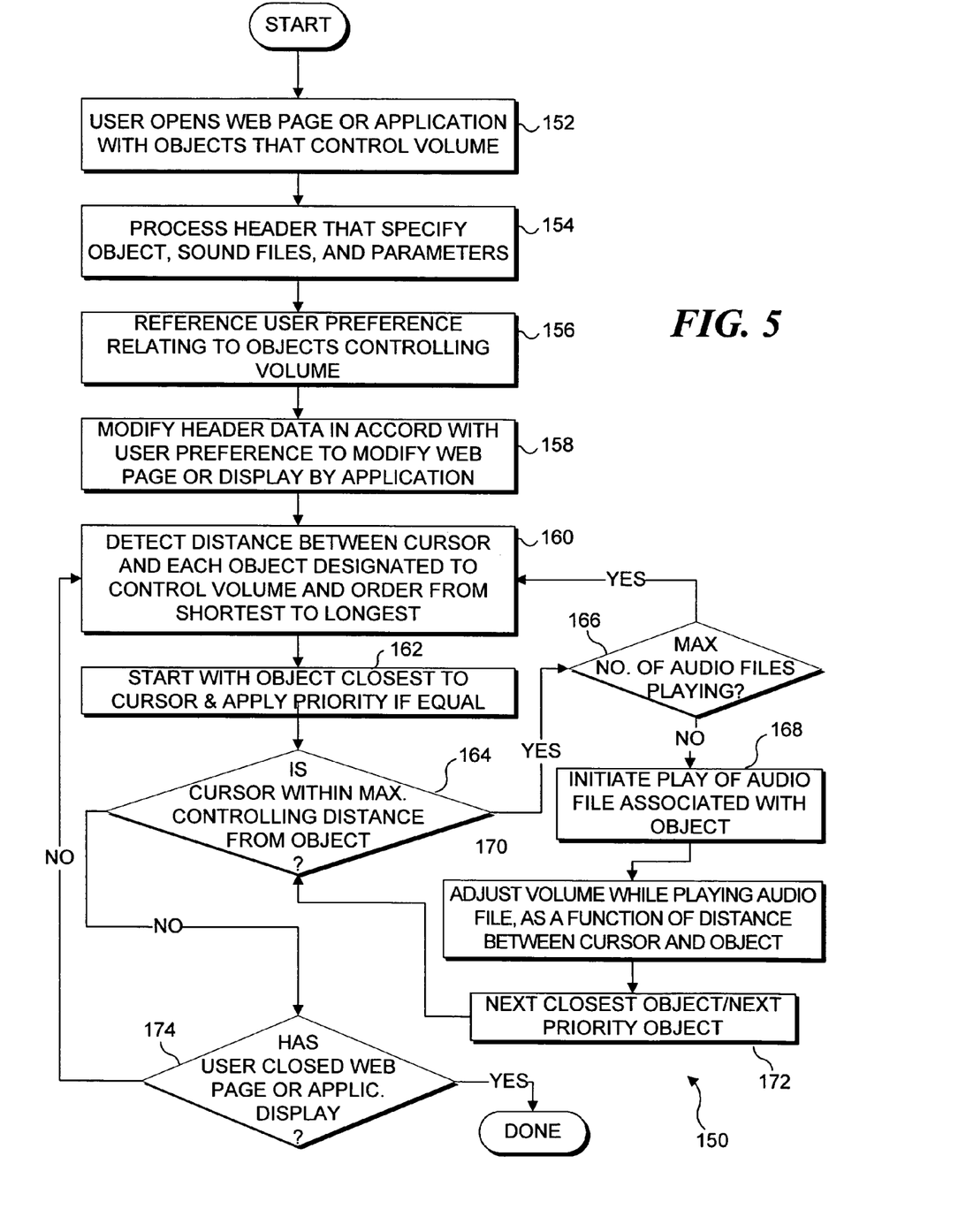
FIG. 5 is an exemplary flow chart showing the logical steps employed for controlling play and the volume of audio file(s) as a function of a distance between an object (or a portion of a displayed image) and a cursor.

FIG. 5 illustrates a flowchart 150 in which the logical steps implemented to carry out the present invention are shown. A step 152 indicates that a user opens a Web page or an application layout that includes objects, which are associated with sound files, enabling a user to control the volume with which the sound files are played based upon the distance between the cursor controlled by the user and the objects. In a step 154, the logic processes a header (or a file) in which each object, its associated sound file, and parameters applied in implementing the present invention are specified. As discussed further below, it is preferable to enable a user to set preferences or values for the parameters relating to playing and controlling the volume of sound files associated with the objects in this invention, to enable the user to choose values for the parameters that are different than the default or different than those selectively set by the designer. Thus, a step 156 provides for referencing any user preferences that have been set for these parameters. A step 158 then modifies the data in the header (or file) in accord with the user preferences for use with the Web page or with a display layout provided by an application.

A step 160 provides for detecting the distance between the cursor controlled by the user and each object that has been designated on the Web page or application layout, for controlling the volume of audio files associated with those objects. The distances detected in step 160 correspond to those illustrated in FIG. 3. In addition, step 160 provides for ordering the distances, e.g., from shortest to longest, to facilitate determining the audio files that should be played. In a step 162, the logic begins processing the object that is closest to the cursor. If two objects are equally close to the cursor, but only one can be played without violating the parameter for the total number of audio files played concurrently, the audio file associated with the object assigned the higher priority is initially played.

With regard to the object currently being processed, a decision step 164 determines if the current position of the cursor is such that the cursor is within a maximum controlling distance from the object. If so, a decision step 166 determines if the maximum number of audio files specified by the designer (or by the user if the user preferences are different than this parameter selected by default or by the designer) is currently being played. An affirmative response leads back to step 160, while a negative response to decision step 166 leads to a step 168, which provides for initiating play of the audio file associated with the current object. In a step 170, the logic adjusts the volume of the audio file being played as a function of the distance between the cursor and the object, which was determined in step 160. A step 172 then begins processing the object that is next closest to the cursor and/or next in the relative priority assigned by the designer. The logic then returns to decision step 164.

If, in decision step 164, the logic determines that the cursor is not within the maximum controlling distance from the current object, the logic proceeds to a decision step 174, which determines if the user has closed the Web page (or the application display) that includes the objects. If so, the logic is done. Otherwise, the logic loops back to step 160.

Exemplary Use of Present Invention in Word Processing Application

Figure 6:
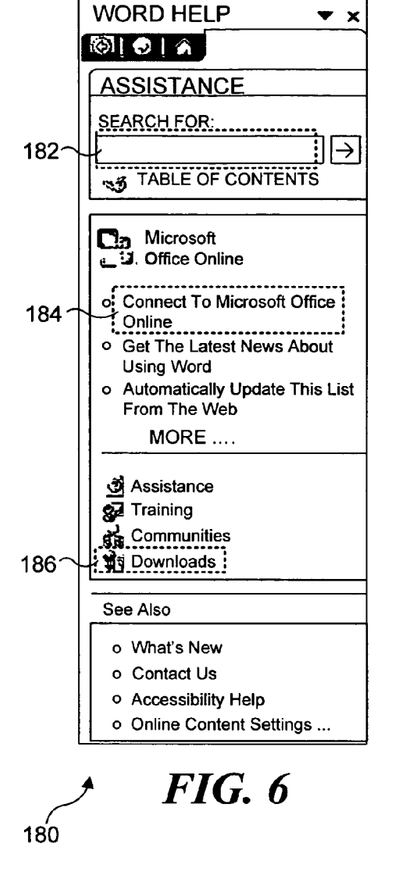
FIG. 6 is an exemplary display of help information from a dialog used in Microsoft Corporation's WORD™ word processing program, which in this example, includes objects or portions associated with audio files controlled in accord with the present invention.
Figure 7:
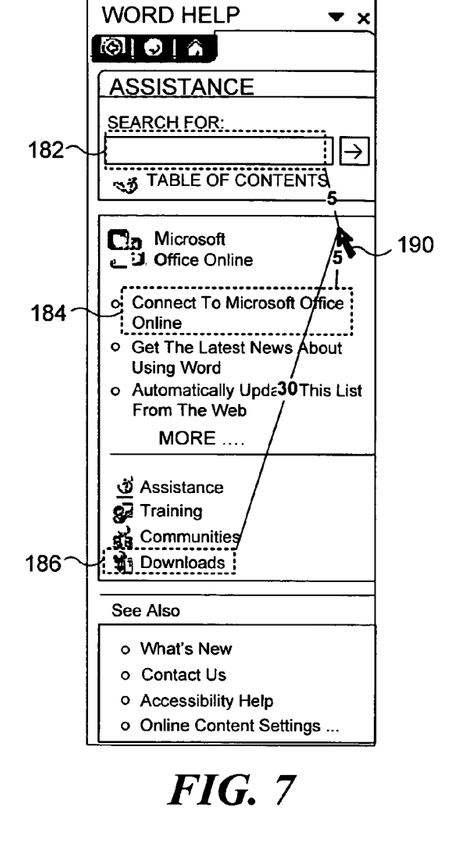
FIG. 7 illustrates the exemplary display of FIG. 6 and shows the distances between a current position of the cursor and each object or portions of the displayed image with which audio files are associated.

As noted above, the present invention is applicable to almost any form of displayed image that includes objects, text, or designated regions. Accordingly, FIGS. 6 and 7 illustrate an exemplary use of this invention in connection with a help dialogue 180 similar to that provided in Microsoft Corporation's WORD™ word processing program. Help dialog box 180 includes three objects or portions of a displayed image that are associated with audio files played in accord with the present invention so that the volume of an audio file is controlled as a function of the distance between a cursor 190 and the object with which the audio file is associated. In this example, a search text entry box 182 represents one of the objects associated with an audio file. Associated with this search text entry box might be an audio file that provides explicit instructions for using the search text entry box to enter a query for help related to a subject of interest. Alternatively, the audio file associated with search text entry box 182 might describe other options for locating help in connection with some feature or function in the word processing program. A portion 184 of the displayed image indicates that the user can selectively click on the text included therein to "connect to Microsoft Office online." The audio file associated with this portion of the displayed image might define the type of help available online at this Web site. Finally, an image and related text 186 are collectively associated with an audio file that might describe the types of downloadable files available online to implement other functions within the word processing program. Clearly, audio files associated with these objects and portions of the displayed image could include many other types of data, information, or instructions for assisting the user.

In FIG. 7, the relative distances between cursor 190 and each of these three objects or portions of the displayed image are indicated. Cursor 190 is currently located five units from search text entry box 182, as well as from portion 184. Image and related text 186 is located about 30 units from the cursor. It is likely that the maximum distance for controlling and associated audio file would be set to substantially less than 30 units, e.g., 10 units, so that play of the audio file associated with image and related text 186 would not be initiated when the cursor is disposed as illustrated. In contrast, the disposition of cursor 190 could cause both the audio file associated with search text entry box 182 and the audio file associated with portion 184 of the displayed image to be played at about the same volume, assuming that the cursor is within the maximum predefined distance from each of these objects in the displayed image, for controlling an audio file. Further, for both audio files to be played at the same time, it would be necessary for the maximum number of audio files that can be simultaneously played to be set to equal at least two. If the maximum number of audio files that can be concurrently played is set to only one, a priority assigned to search text entry box 182 and to portion 184 would determine the audio file that is played, since the one having the higher priority assigned would be selected for play in this case.

Figure 8:
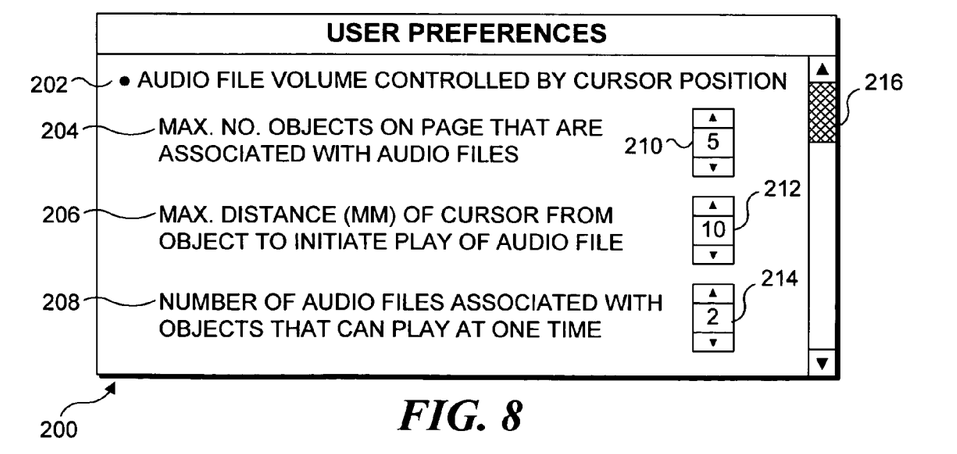
FIG. 8 illustrates an exemplary user preference dialog box showing some of the parameters that can be set by a user (and/or by a designer of a Web page or displayed image) to control the manner in which audio files are played and the volume of the audio files is varied in response to the distance between designated objects or portions of the displayed image and a cursor.

FIG. 8 illustrates a dialog box 200 for entry or selection of user preferences. Although other preferences might be selectable within dialog box 200, the example illustrated shows three parameters related to the control of the volume of audio file based upon cursor position, which can be selectively set by the user. This section of the user preferences dialog is identified by a title 202. A first parameter 204 is identified as "Maximum Number of Objects on Page That Are Associated with Audio Files." A value selector 210 enables input of a user preference for the value of this parameter. Initially, the value selector can be set to the default or to the value determined by the designer of the displayed image for which user preferences are being set. Similarly, a second parameter 206 is identified as "Maximum Distance (mm) of Cursor from Object to Initiate Play of Audio File." A value selector to 212 enables the user to input a desired value that is different than the default value or the value determined by the designer. Finally, a third parameter 208 is identified as "Number of Audio Files Associated with Objects That Can Play at One Time." A value selector 214 enables the user to select a different value for this parameter than the default value or than the value designated by the designer. While only three parameters are illustrated here, it will be apparent that values for additional parameters relating to the manner in which the position of the cursor controls the volume of an audio file associated with an object or a portion of the displayed image might also be selectively set within dialog box 200 as desired by the user. Accordingly, a scrollbar 216 enables the user to access these additional parameters for input of desired values.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling a user to discover, from within a content page, audio files that are not indicated or visually evident to a user who opens the content page, and to control play of the audio files that are associated with portions of the content page, comprising the steps of:
   (a) receiving a content page, the content page having a layout designed by a designer and including audio-related content and non-audio related content from the designer, wherein the audio-related content includes a plurality of content portions that the designer has associated with a respective audio file, and the non-audio related content including content portions which are not associated by the designer with a respective audio file, the audio-related content being positioned in locations which are unknown by the user as being associated with audio;
   (b) receiving information identifying the plurality of content portions making up the audio-related content, the information being provided by the designer;
   (c) displaying the content page, including all audio-related content and all non-audio related content;
   (d) determining a distance between a cursor on the displayed content page and each of the plurality of content portions of the audio-related content according to the layout of the designer;
   (e) ordering the plurality of content portions of the audio-related content according to distance from the cursor;
   (f) determining which audio files to play, which comprises, for each of the ordered content portions, and beginning with the content portion having the shortest distance;
      (i) determining whether the distance is less than a maximum distance set by the designer of the content page;
      (ii) determining whether a predefined maximum number of audio files, as set by the user in a user preference setting, are currently playing; and
      (iii) only when the distance is less than the maximum distance and the maximum number of audio files are not already being played, initiating play of the audio file of the corresponding ordered content portion; and
   (g) controlling the volume of sound heard when each initiated audio file is played, as a function of the distance, wherein the volume increases as the distance decreases and decreases as the distance increases.

2. The method of claim 1, wherein receiving information identifying the plurality of content portions making up the audio-related content includes receiving a relative priority for each of the plurality of content portions of the audio-related content, each relative priority being specified by the designer of the layout of the content page, and wherein ordering the plurality of content portions according to distance comprises:
   when two or more of the plurality of content portions have the same distance, ordering the two or more content portions according to relative priority.

3. The method of claim 1, farther comprising retrieving user preference data from the user preference setting.

4. The method of claim 3, wherein the user preference setting overrides parameters set by the designer and received in the information identifying the plurality of content portion making up the audio-related contents.

5. The method of claim 3, wherein the content page is a Web page.

6. The method of claim 1, wherein the content page is an image of a word processing application.

7. The method of claim 5, wherein receiving information identifying the plurality of content portions making up the audio-related content is performed concurrently with receiving the Web page, and wherein the received information identifying the plurality of content portions of the audio-related content is all received in a Web page header attached to the content page, the Web page header including an identification of all content portions with which each audio file is associated, a relative priority of each content portion associated with an audio file, and parameters that control the play of the different audio files.

8. A memory medium storing machine instructions for carrying out the steps of claim 1.

9. A system for controlling play of an audio file that is associated with a portion of a displayed content page and allowing a user to discover audio files not visually evident within the displayed content page, comprising:
   (a) a display for displaying content pages;
   (b) a pointing device for controlling a position of a cursor on the display;
   (c) a memory in which machine instructions and data are stored; and
   (d) a processor that is coupled to the display, the pointing device, and the memory, the processor executing the machine instructions to carry out a plurality of functions, including:
      (i) displaying an image that defined by the data stored in the image including the portion associated with audio file, the data including the audio file;
      (ii) determining a distance between the potion of the displayed image and a (iii) initiating play of the audio file if the distance is less than a predefined value; and (iv) controlling the volume of sound heard when the audio file is played, as a function of the distance, the volume decreases as the distance increases and increases as the distance decreases. (i) receiving a content page, the content page having a layout designed by a designer and including audio-related content and non-audio related content from the designer, wherein the audio-related content includes a plurality of content portions that the designer has associated with a respective audio file, and the non-audio related content including content portions which are not associated by the designer with a respective audio file, wherein at least some of the content portions that the designer has associated with a respective audio file have locations unknown to the user;

(ii) receiving information identifying the plurality of content portions making up the audio-related content, the information being provided by the designer;

(iii) displaying the content page, including all audio-related content and all non-audio related content;

(iv) determining a distance between a cursor on the displayed content page and each of the plurality of content portions of the audio-related content according to the layout of the designer;

(v) ordering the plurality of content portions of the audio-related content according to distance from the cursor;

(vi) determining which audio files to play, which comprises, for each of the ordered content portions, and beginning with the content portion having the shortest distance:

(1) determining whether the distance is less than a maximum distance set by the designer of the content page;

(2) determining whether a predefined maximum number of audio files, as set by the user in a user preference setting, are currently playing; and (3) only when the distance is less than the maximum distance and the maximum number of audio files are not already being played, initiating play of the audio file of the corresponding ordered content portion; and (vii) controlling the volume of sound heard when each initiated audio file is played, as a function of the distance, wherein the volume increases as the distance decreases and increases as the distance decreases.

10. The system of claim 9, wherein receiving information identifying the plurality of content portions making up the audio-related content includes receiving a relative priority for each of the plurality of content portions of the audio-related content, each relative priority being specified by the designer of the layout of the content page, and wherein ordering the plurality of content portions according to distance comprises:

when two or more of the plurality of content portions have the same distance, ordering the two or more content portions according to relative priority.

11. The system of claim 9, wherein the machine instructions executed by the processor further enable the processor to retrieve user preference data from the user preference setting.

12. The system of claim 11, wherein the user preference setting overrides parameters set by the designer and received in the information identifying the plurality of content portions making up the audio-related contents.

13. The system of claim 11, wherein the content page is a Web page.

14. The system of claim 9, wherein the content page is an image produced by a word processing application.

15. The system of claim 13, wherein receiving information identifying the plurality of content portions making up the audio-related content is performed concurrently with receiving the Web page, and wherein the received information identifying the plurality of content portions of the audio-related content is all received in a Web page header attached to the content page, the Web page header including an identification of all content portions with which each audio file is associated, a relative priority of each content portion associated with an audio file, and parameters that control the play of the different audio files.

16. A method for enabling a user to view a web page with a layout designed by a designer and discover audio files on the Web page which are not visually evident, and to control a volume of sound produced by playing audio files associated with an object in the Web page, comprising the steps of:

(a) receiving a Web page from a server, the Web page having a layout designed by the designer and including various objects, some of the objects each being associated with a respective audio file, and other objects not being associated with any audio file, wherein at least some of the objects associated with a respective audio file are not visually evident to the user such that the user is unaware such objects may have audio files associated therewith, and wherein the received Web page includes a header that identifies which of the various objects are associated with audio files, audio files associated with such objects, a respective priority of each object, and a maximum distance value;

(b) displaying the Web page according to the layout of the designer, so as to include both the objects associated with an audio file and objects not associated with any audio file;

(c) access a predefined user preference setting, the predefined user preference setting identifying:

(i) a maximum number of objects that are to be associated with audio files on the Web page;

(ii) a maximum distance of a cursor from an object for initiation of play of an audio file, the maximum distance of the cursor in the predefined user preference setting varying from the maximum distance of the designer and included in the header; and (iii) a maximum number of audio files associated with objects that can play simultaneously;

(d) modifying the header to overwrite any parameters that conflict with the predefined user preference setting, including at least the maximum distance value;

(e) displaying the cursor on the Web page, where a position of the cursor on the Web page is controlled by the user manipulating a pointing device;

(f) determining a distance between the cursor and each object of the Web page that is associated with a image with which the audio file is associated, and ordering the objects according to distance, wherein ordering the objects includes evaluating the relative priority of objects having the same distance;

(g) response to the cursor being moved, evaluating, for each ordered object, and beginning with the object having the shortest distance, whether the distance is less than a maximum distance set by the user and included in the header to override the designer's maximum distance, and when the distance is less than the maximum distance, whether the maximum number of audio files that can play simultaneously is met, and thereafter initiating play of the audio file associated with the object only the distance is less than the maximum distance and the maximum number of audio files that can play simultaneously would not be exceeded; and (h) controlling a volume of the sound produced while playing each initiated audio file, as a logarithmic function of the distance, so that if the user decreases the distance by moving the cursor closer to the portion of the respective object, the volume of the corresponding audio file is automatically increased, and conversely, if the user increases the distance by moving the cursor farther from the respective object, the volume correspondingly automatically decreases.

17. The method of claim 16, wherein the objects of the Web page associated with an audio file include each a graphical object, and a textual object.

18. The method of claim 16, wherein the user selects the Web page, and wherein each of the objects of the Web page associated with a respective audio file is configured to play its respective audio file automatically, without user selection of the corresponding object, when the user positions the cursor within the maximum distance.

19. The method of claim 18, wherein the header specifies a common maximum distance parameter for each of the objects associated with an audio file.

20. The method of claim 19, wherein the header specifies a maximum distance parameter individually, for each object associated with an audio file, such that each object associated with an audio file can have a different associated maximum distance for initiation of play of its corresponding audio file.

* * * * *

UNITED STATES PATENT AND TRADEMARK OFFICE
CERTIFICATE OF CORRECTION

PATENT NO.        : 7,509,593 B2                          Page 1 of 1
APPLICATION NO.   : 11/129191
DATED             : March 24, 2009
INVENTOR(S)       : Takehiro Kaminagayoshi It is certified that error appears in the above-identified patent and that said Letters Patent is hereby corrected as shown below:

In column 12, line 3, in Claim 1, delete "distance;" and insert -- distance: --, therefor.

In column 12, line 27, in Claim 3, delete "farther" and insert -- further --, therefor.

In column 12-13, lines 63-67 (col. 12) and 1-6 (col. 13), in Claim 9, after "including:" delete "(i) displaying an image that defined by the data stored in the image including the portion associated with audio file, the data including the audio file; (ii) determining a distance between the portion of the displayed image and a (iii) initiating play of the audio file if the distance is less than a predefined value; and (iv) controlling the volume of sound heard when the audio file is played, as a function of the distance, the volume decreases as the distance increases and increases as the distance decreases.".

In column 14, line 59, in Claim 16, delete "response" and insert -- in response --, therefor.

Signed and Sealed this
Third Day of May, 2011

David J. Kappos
*Director of the United States Patent and Trademark Office*